(12) United States Patent
Lin

(10) Patent No.: US 7,248,465 B2
(45) Date of Patent: Jul. 24, 2007

(54) ELECTRONIC DEVICE CAPABLE OF RECEIVING A MEMBER

(75) Inventor: Hsien-Tang Lin, Taichung (TW)

(73) Assignee: Benq Corporation, Taoyuan (TW)

( * ) Notice: Subject to any disclaimer, the term of this patent is extended or adjusted under 35 U.S.C. 154(b) by 162 days.

(21) Appl. No.: 11/026,175

(22) Filed: Dec. 30, 2004

(65) Prior Publication Data
US 2005/0147448 A1 Jul. 7, 2005

(30) Foreign Application Priority Data
Jan. 2, 2004 (TW) .............................. 93100041 A

(51) Int. Cl.
*H05K 5/00* (2006.01)
(52) U.S. Cl. .................... 361/683; 343/702; 347/33
(58) Field of Classification Search ........ 361/679–682, 361/724–727; 343/702, 703; 347/33; 705/5
See application file for complete search history.

(56) References Cited

U.S. PATENT DOCUMENTS 5,412,191 A * 5/1995 Baitz et al. .................... 705/5
5,818,360 A * 10/1998 Chu et al. .................... 341/22
5,943,018 A * 8/1999 Miller ........................ 343/702
6,501,429 B2 * 12/2002 Nakamura et al. .......... 343/702
6,688,722 B2 * 2/2004 Uchida et al. ................ 347/33

FOREIGN PATENT DOCUMENTS

CN 2382058 Y 6/2000

* cited by examiner

*Primary Examiner*—Hung Van Duong
(74) *Attorney, Agent, or Firm*—Thomas, Kayden, Horstemeyer & Risley

(57) ABSTRACT

An electronic device capable of receiving a member comprises a housing, a display unit, a first switch unit and a receiving device. The display unit is disposed in the housing and the receiving device is connected to the housing. The receiving device is movable between a first position and a second position to receive the member. When the display unit is switched from the first mode to the second mode by the first switch unit, the carriage moves from the first position to the second position.

11 Claims, 4 Drawing Sheets

ELECTRONIC DEVICE CAPABLE OF RECEIVING A MEMBER

BACKGROUND

The present invention relates to an electronic device capable of receiving a member, and in particular to an electronic device with a display unit comprising a receiving device for receiving a member.

For example, a monitor and a keyboard are two separate components required by a conventional Personal Computer (PC). After a host of the PC is shut down or the monitor is turned off, the keyboard is often stored on the table, or simply set aside on another surface.

SUMMARY

Accordingly, an object of the invention is to provide an electronic device capable of receiving a member.

The electronic device comprises a housing, a control device, a display unit and a receiving device. The display unit is disposed in the housing, and the receiving device is connected to the housing. The receiving device comprises a carriage and a driving device connected to the control device. The carriage movable between a first position and a second position comprises a base for receiving the member, and the driving device is connected to the carriage to make it move between above positions.

Another object of the invention is to provide an electronic device capable of receiving a member comprising a housing, a display unit, a first switch unit and a receiving device. The display unit is disposed in the housing and the receiving device is connected to the housing. The receiving device is movable between a first position and a second position to receive the member. When the display unit is switched from the first mode to the second mode by the first switch unit, the carriage moves from the first position to the second position.

The receiving device further comprises a driving device connected to the carriage to make it move between above positions.

Additionally, the electronic device further comprises a control device with a circuit unit electrically connected to the drive device and the carriage, and the receiving device further comprises a second switch unit electrically connected to the circuit unit. When switching the display unit from the first mode to the second mode, the first switch unit transmits a first signal to the circuit unit for moving the carriage from the first position to the second position, and the second switch unit transmits a second signal to the circuit unit for stopping the driving device when the carriage arrives the second position.

A detailed description is given in the following embodiments with reference to the accompanying drawings.

DESCRIPTION OF THE DRAWINGS

The present invention can be more fully understood by reading the subsequent detailed description and examples with references made to the accompanying drawings, wherein.

DETAILED DESCRIPTION

Figure 1:
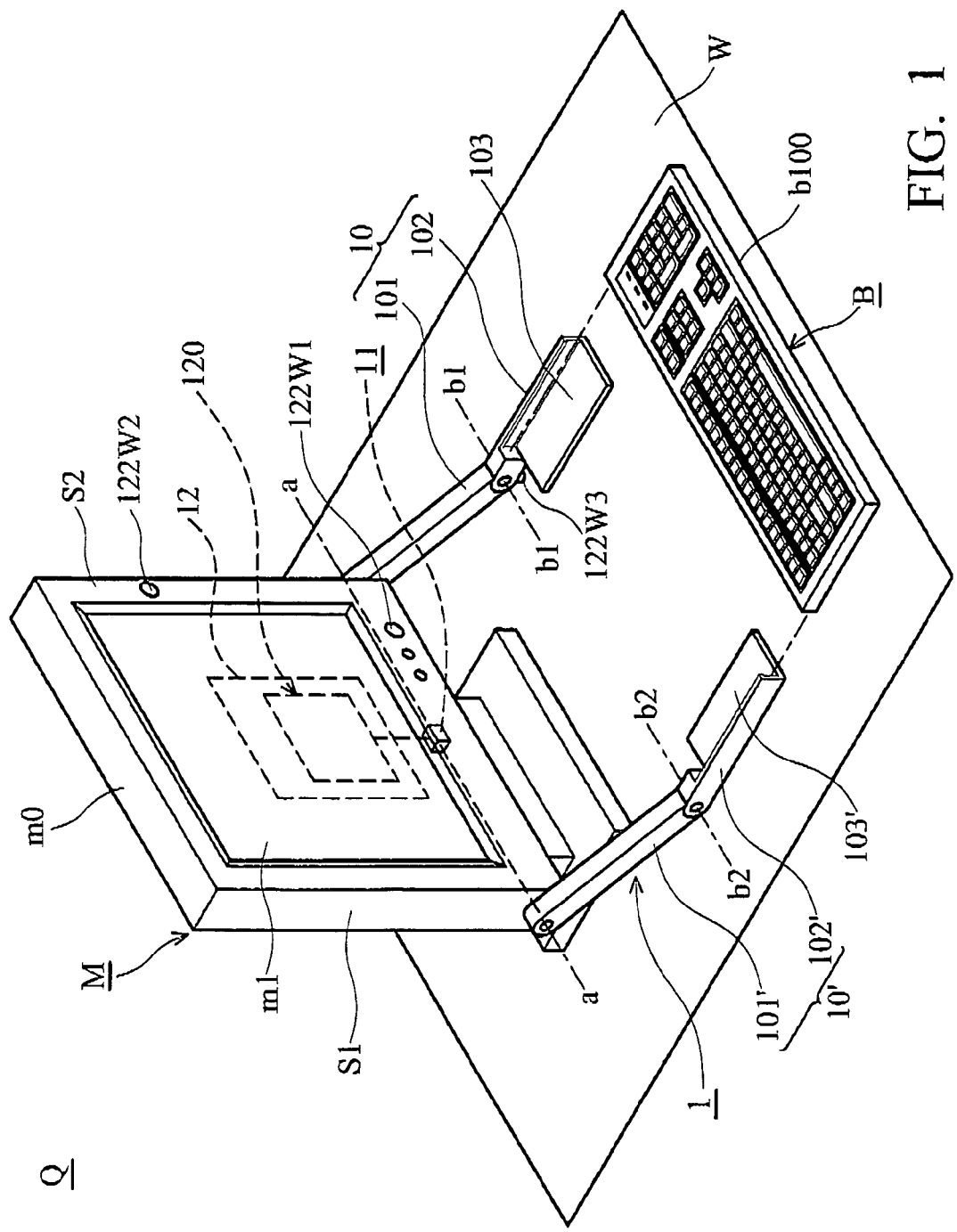
FIG. 1 is a perspective view of an embodiment of the invention, wherein a monitor and a keyboard are taken as examples of the electronic device and the member.

Referring to FIG. 1, an electronic device Q such as a monitor M placed on a surface W comprises a housing m0, a display unit m1 disposed in the housing m0 and a receiving device 1. The receiving device 1 comprises a pair of carriages 10 and 10', and a driving device 11. The driving device 11 electrically connects to a control device 12 with a circuit board 120, a first switch unit 122W1, a second switch unit 122W2 and a third switch unit 122W3.

Figure 2A:
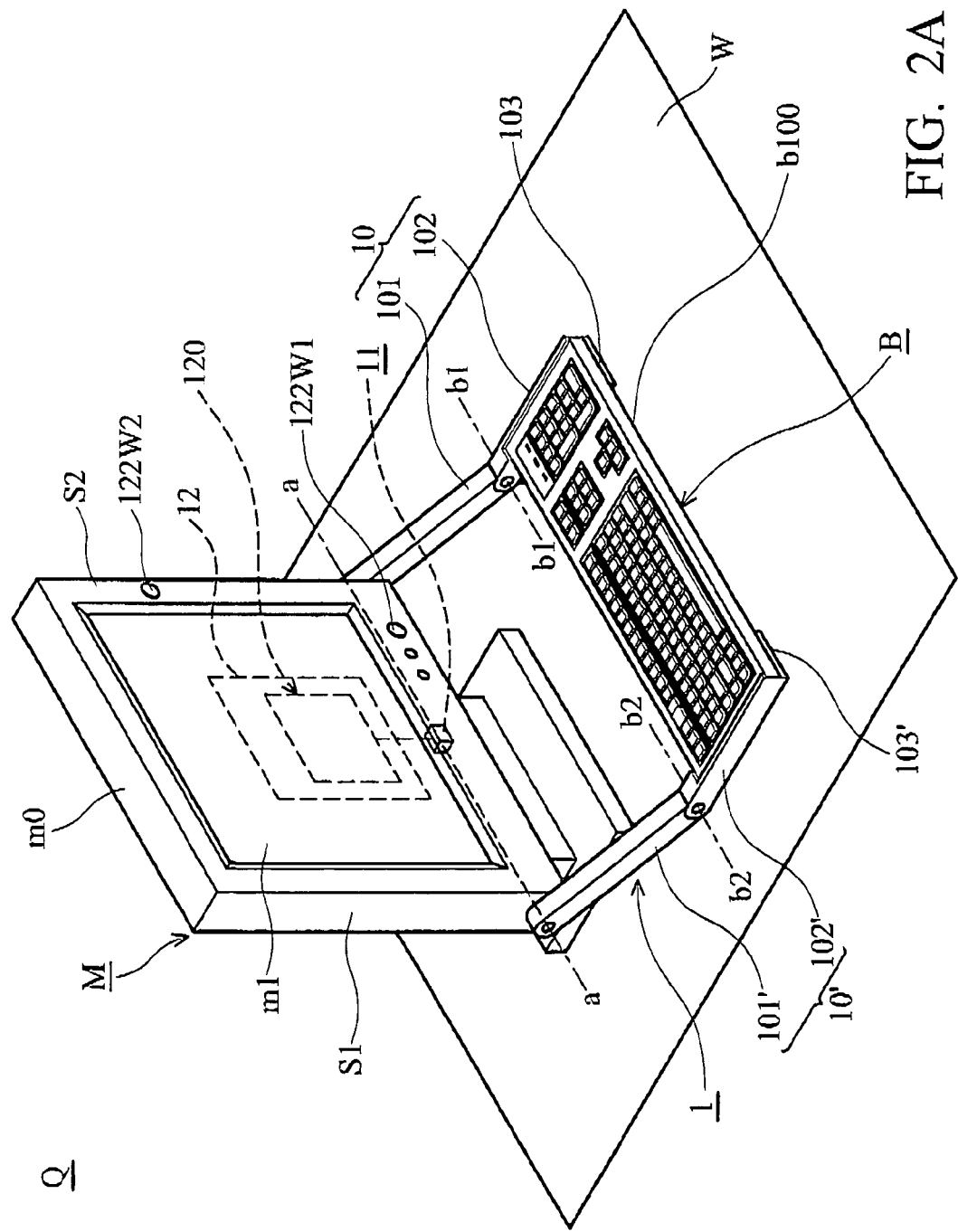
FIG. 2A is a perspective view of FIG. 1, wherein the receiving device is in a first position.
Figure 2B:
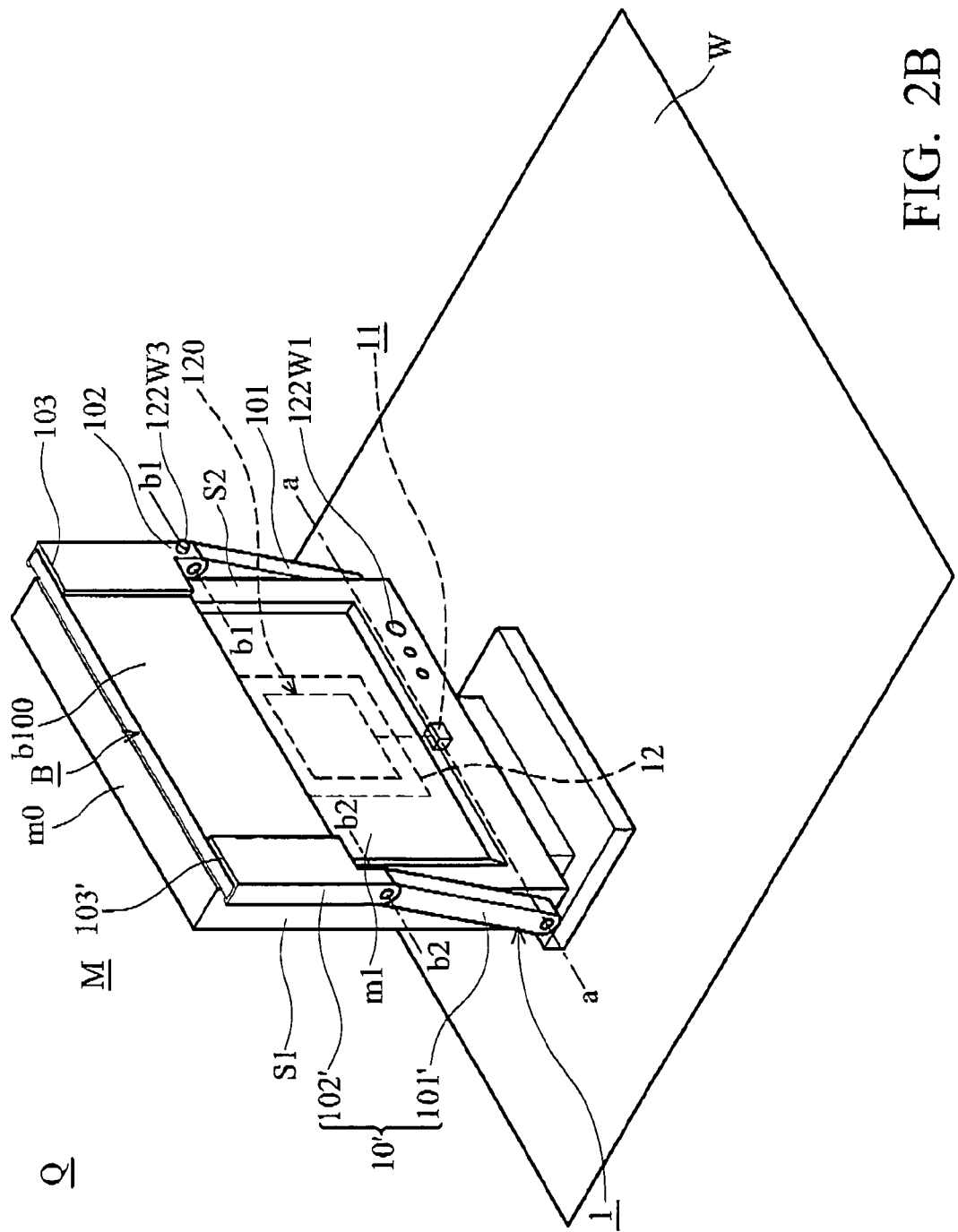
FIG. 2B is a perspective view of FIG. 1, wherein the receiving device is in a second position.

The carriages 10 and 10', respectively disposed on the sides S1 and S2 of the housing m0, are pivoted to the housing m0 and movable around an axis a-a between a first position (See FIG. 2A) and a second position (See FIG. 2B). The carriages 10 and 10' comprise the first arms 101 and 101', pivoted on the housing m0 along the axis a-a, the second arms 102 and 102', respectively pivoted on the first arms 101 and 101' along an axis b1-b1, and the base 103 and 103' are respectively disposed on the second arms 102 and 102'. A member B, such as a keyboard, is received by the bases 103, 103' of the carriages 10 and 10'.

The driving device 11 connected to the carriages 10 10 and 10' drives movement thereof between the first and second positions in an embodiment of the invention, the driving device 11 is a motor connected to a gearbox (not shown) to adjust the speed of the carriages 10 and 10'. In some embodiments, the driving device 11 can be a hydraulic system such as cylinder.

The circuit unit 120 of the control device 12 disposed in the housing m0 is electrically connected to the driving device 11. The first switch unit 122W1 disposed on the housing m0 is electrically connected to the circuit unit 120 and the display unit m1. The display unit m1 is switched between first and second modes (ON) and (OFF) by the first switch unit 122W1.

The second and third switch units 122W2 and 122W3 are electrically connected to the circuit unit 120. The second switch unit 122W2 is disposed on the front of the housing m0 and the third switch unit 122W3 is disposed on the carriage 10. In an embodiment of the invention, the second and third switch units 122W2 and 122W3 are sensors.

In FIG. 2A, the member B, such as a keyboard, received by the bases 103 and 103' of the carriages 10 and 10' is in the first position.

Figure 3:
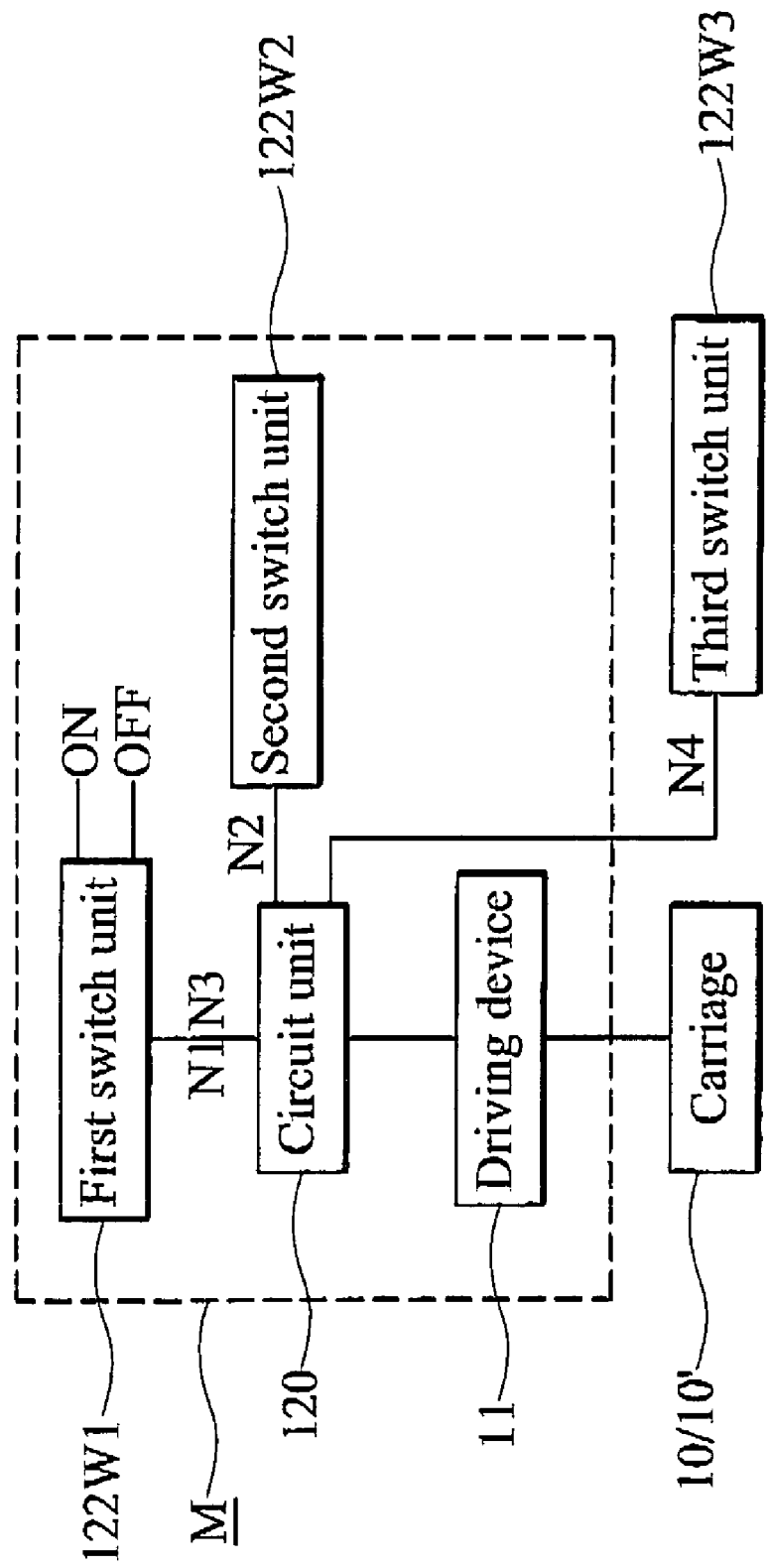
FIG. 3 is a block diagram of the embodiment of the invention.

Referring also to FIG. 3, when switching the display unit of the electronic device, such as the monitor M, from the first mode (ON) to the second mode (OFF), i.e., the display unit is turned off, the first switch unit 122W1 transmits a first signal N1 to the circuit unit 120, actuating the driving device to move the carriages 10, 10' from the first to the second position.

As the carriages 10, 10' arrives the second position in FIG. 2B, the second switch unit 122W2 transmits a second signal N2 to the circuit unit 120 to stop the driving device 11. Thus, the member B, such as the keyboard, received by the bases 103 and 103' of the carriages 10 and 10' is under a received state.

In this embodiment, when the keyboard is under the received state, the bottom b100 of the keyboard acts as a shield covering the display unit m1 to prevent the display unit m1 from colliding.

It should be understood that the location of the second switch units 122W2 is not limited to the disclosed embodiments. The second switch unit 122W2 could be a displacement sensor (not shown in FIGs.) or the like which detects degree of the rotation of the carriages 10, 10' to judge the position of the carriages 10 and 10'.

Similarly, when switching the first switch unit 122W1 from the second mode (OFF) to the first mode (ON), i.e., the display unit m1 is turned on, the first switch unit 122W1 transmits a third signal N3 to the circuit unit 120 actuating the driving device to move the carriages 10, 10' from the second position to the first position.

When the carriages 10, 10' arrive the first position as shown in FIG. 2A, the second switch unit 122W2 disposed on the carriages 10, 10' contacts the surface W and transmits a fourth signal N4 to the circuit unit 120 to stop the driving device 11. Then the member B, such as the keyboard, received by the bases 103, 103' of the carriages 10,10' is in the first position, so that the member B located on the carriages 10 and 10' is under an operation state.

A third switch 122W3 is selectively adapted on the carriages 10,10' for sending signals to the circuit unit 120 to stop the driving device 11, when the carriages 10, 10' arrive the first position from the second position.

It should be understood that the invention could be applied to desk-top, mobile phone or LCD-TV, such electronic device including a display unit, and the member could be keyboard, keypad, or a dust cover.

While the invention has been described in connection with what is presently considered to be the most practical and preferred embodiment, it is to be understood that the invention is not limited to the disclosed embodiments, but, on the contrary, is intended to accommodate various modifications and equivalent arrangements included within the spirit and scope of the appended claims.

What is claimed is:

1. An electronic device capable of receiving a member, comprising:
   a housing;
   a display unit disposed in the housing;
   a control device; and
   a receiving device movable between a first position and a second position, comprising a carriage controlled by the control device and connected to the housing to receive the member and a driving device connected to the carriage to make the carriage move.

2. The electronic device as claimed in claim 1, wherein the driving device includes a motor.

3. The electronic device as claimed in claim 1, wherein the carriage includes a base to receive the member.

4. An electronic device capable of receiving a member, comprising:
   a housing;
   a display unit disposed in the housing;
   a control device;
   a receiving device movable between a first position and a second position, comprising a carriage controlled by the control device and connected to the housing to receive the member and a driving device connected to the carriage to make the carriage move; and
   a first switch unit connected to the display unit to switch the display unit between a first mode and a second mode;
   wherein when switching the display unit from the first mode to the second mode by the first switch unit, the receiving device moves from the first position to the second position.

5. The electronic device as claimed in claim 4, wherein the driving device includes a motor.

6. The electronic device as claimed in claim 4, wherein the carriage includes a base to receive the member.

7. The electronic device as claimed in claim 4, the control device further including a circuit unit electrically connected to the driving device and the first switch unit;
   wherein when switching the display unit from the first mode to the second mode, the first switch unit transmits a first signal to the circuit unit for moving the carriage from the first position to the second position by the driving device.

8. The electronic device as claimed in claim 7, further comprising a second switch unit electrically connected to the circuit unit to transmit a second signal to the circuit unit for stopping the driving device when the carriage arrives the second position.

9. The electronic device as claimed in claim 8, wherein the second switch unit is disposed in the housing.

10. The electronic device as claimed in claim 8, wherein the second switch unit is disposed in the receiving device.

11. The electronic device as claimed in claim 8, wherein the second switch unit is a sensor.

* * * * *